United States Patent
Shankar et al.

(10) Patent No.: US 8,135,688 B2
(45) Date of Patent: Mar. 13, 2012

(54) PARTITION/TABLE ALLOCATION ON DEMAND

(75) Inventors: Shrikanth Shankar, San Francisco, CA (US); Ananth Raghavan, San Francisco, CA (US); Badhri G. Varanasi, Palo Alto, CA (US)

(73) Assignee: Oracle International Corporation, Redwood Shores, CA (US)

( * ) Notice: Subject to any disclaimer, the term of this patent is extended or adjusted under 35 U.S.C. 154(b) by 328 days.

(21) Appl. No.: 11/764,131

(22) Filed: Jun. 15, 2007

(65) Prior Publication Data

US 2008/0313209 A1    Dec. 18, 2008

(51) Int. Cl.
*G06F 17/30* (2006.01)

(52) U.S. Cl. ........ 707/696; 707/640; 707/661; 707/693; 707/828

(58) Field of Classification Search ............ 707/1, 2, 707/100, 102, 200, 205, 667, 694, 640, 661, 707/693, 696, 828, 830
See application file for complete search history.

(56) References Cited

U.S. PATENT DOCUMENTS

| | | |
|---|---|---|
| 5,551,027 A | 8/1996 | Choy et al. |
| 5,822,142 A | 10/1998 | Hicken |
| 5,832,496 A | 11/1998 | Anand et al. |
| 5,983,215 A | 11/1999 | Ross et al. |
| 6,002,866 A | 12/1999 | Fuller |
| 6,003,036 A | 12/1999 | Martin |
| 6,341,289 B1 * | 1/2002 | Burroughs et al. ........ 707/104.1 |
| 6,405,198 B1 * | 6/2002 | Bitar et al. ........................ 707/6 |
| 6,427,147 B1 | 7/2002 | Marquis |
| 6,473,774 B1 | 10/2002 | Cellis et al. |
| 6,484,179 B1 | 11/2002 | Roccaforte |
| 6,609,131 B1 | 8/2003 | Zait et al. |
| 6,711,563 B1 | 3/2004 | Koskas |
| 6,820,095 B1 | 11/2004 | Yeung et al. |
| 6,867,991 B1 | 3/2005 | Tezcan et al. |
| 6,920,460 B1 | 7/2005 | Srinivasan et al. |
| 6,931,390 B1 | 8/2005 | Zait et al. |
| 7,143,091 B2 | 11/2006 | Charnock et al. |
| 7,143,105 B2 | 11/2006 | Nakano et al. |
| 7,146,377 B2 * | 12/2006 | Nowicki et al. .......... 707/999.01 |

(Continued)

OTHER PUBLICATIONS

Oracle Corporation, Oracle8 Concepts Release 8.0 A58227-01, 9 Partitioned Tables and Indexes, http://download-east.oracle.com/docs/cd/A58617_01/server.804/a58227/ch_pti.htm#436962, printed Sep. 26, 2007, pp. 1-31.

(Continued)

*Primary Examiner* — Tim T Vo
*Assistant Examiner* — Dangelino Gortayo
(74) *Attorney, Agent, or Firm* — Hickman Palermo Truong & Becker LLP; Karl T. Rees

(57) ABSTRACT

A method and apparatus for the on-demand allocation of segments and creation of metadata for previously-created data storage spaces and partitions are provided. A space is created in a database. As part of this creation process, no segment is allocated for the space. Rather, metadata describing the space sufficiently to allocate the segment in the future is created and maintained by the database. Data is received indicating a new item. Based on the metadata, it is determined that the new item pertains to the space. In response to the determination, a segment is allocated for the space. Additional metadata necessary for normal database operations in relation to the space and newly-allocated segment may also be created at this time. The new item can then be stored in the space.

32 Claims, 6 Drawing Sheets

U.S. PATENT DOCUMENTS

| | | | |
|---|---|---|---|
| 7,158,996 B2 | 1/2007 | Croisettier et al. | |
| 7,334,002 B2* | 2/2008 | Byrne | 707/202 |
| 7,356,549 B1 | 4/2008 | Bruso et al. | |
| 7,395,402 B2* | 7/2008 | Wilson et al. | 711/173 |
| 7,406,499 B2* | 7/2008 | Singh et al. | 709/205 |
| 7,447,839 B2* | 11/2008 | Uppala | 711/114 |
| 7,457,832 B2* | 11/2008 | Baird et al. | 707/203 |
| 7,458,066 B2 | 11/2008 | Rhine | |
| 7,483,981 B2 | 1/2009 | Weinert et al. | |
| 7,617,370 B2* | 11/2009 | Jernigan et al. | 711/165 |
| 7,676,514 B2* | 3/2010 | Faibish et al. | 707/646 |
| 7,698,334 B2* | 4/2010 | Kazar et al. | 707/737 |
| 7,716,420 B2* | 5/2010 | Gole et al. | 711/114 |
| 7,716,448 B2* | 5/2010 | Schneider | 711/170 |
| 7,774,329 B1 | 8/2010 | Peddy et al. | |
| 7,890,541 B2 | 2/2011 | Teng et al. | |
| 7,949,865 B1* | 5/2011 | Yadav | 713/1 |
| 2002/0087510 A1 | 7/2002 | Weinberg et al. | |
| 2002/0194157 A1 | 12/2002 | Zait et al. | |
| 2002/0194196 A1 | 12/2002 | Weinberg et al. | |
| 2003/0061263 A1 | 3/2003 | Riddle | |
| 2003/0149702 A1 | 8/2003 | Saffer et al. | |
| 2004/0260671 A1 | 12/2004 | Potter et al. | |
| 2004/0267782 A1 | 12/2004 | Nakano et al. | |
| 2005/0187897 A1* | 8/2005 | Pawar et al. | 707/1 |
| 2006/0004886 A1 | 1/2006 | Green et al. | |
| 2006/0206507 A1* | 9/2006 | Dahbour | 707/100 |
| 2006/0253431 A1 | 11/2006 | Bobick et al. | |
| 2007/0239793 A1* | 10/2007 | Tyrrell et al. | 707/200 |
| 2007/0260842 A1* | 11/2007 | Faibish et al. | 711/170 |
| 2008/0091690 A1 | 4/2008 | Ellersick et al. | |
| 2008/0104359 A1* | 5/2008 | Sauer et al. | 711/202 |
| 2008/0114749 A1 | 5/2008 | Chandhok et al. | |
| 2008/0140937 A1 | 6/2008 | Nalawade et al. | |
| 2008/0228829 A1 | 9/2008 | Crutchfield et al. | |
| 2008/0256029 A1 | 10/2008 | Abrink | |

OTHER PUBLICATIONS

Oracle Corporation, Oracle® Database Concepts 10g Release 1 (10.1) Part No. B10743-01, 18 Partitioned Tables and Indexes, http://download-east.oracle.com/docs/cd/B14117_01/server.101/b10743/partconc.htm, printed Sep. 26, 2007, pp. 1-16.

Oracle Corporation, Oracle® Database Administrator's Guide 10g Release 1 (10.1) Part No. B10739-01, 16 Managing Partitioned Tables and Indexes, http://download-east.oracle.com/docs/cd/B14117_01/server.101/b10739/partiti.htm, printed Sep. 26, 2007, pp. 1-62.

Oracle Corporation, Oracle® Database Concepts, 10g Release 1 (10.1) Part No. B10743-01, 2 Data Blocks, Extents, and Segments, http://download-east.oracle.com/docs/cd/B14117_01/server.101/b10743/logical.htm, printed Sep. 26, 2007, pp. 1-19.

Oracle Corporation, Oracle8 Concepts Release 8.0 A58227-01, 4 The Data Dictionary, http://download-east.oracle.com/docs/cd/A58617_01/server.804/a58227/ch8.htm, printed Sep. 26, 2007, pp. 1-6.

Oracle Corporation, Oracle® Database Concepts 10g Release 1 (10.1) Part No. B10743-01, http://download-east.oracle.com/docs/cd/B14117_01/server.101/b10743/schema.htm, printed Sep. 26, 2007, pp. 1-46.

Shahzad, Muhammad A., "Data Warehousing with Oracle", Proc. Of SPIE, vol. 3695, Orlando, FL, Apr. 5, 1999, pp. 179-190.

Farazdel, Abbas et al., "Oracle8i Parallel Server on IBM SP systems: Implementation Guide", IBM Redbooks, SG24-5591-00, Dec. 1999, pp. cover, i-ii, 56-60, 119-120 and 122.

Leverenz et al., "Oracle8 Server Concepts", Jun. 1997, Release 8.0, pp. 8-1 to 8-40.

* cited by examiner

PARTITION/TABLE ALLOCATION ON DEMAND

FIELD OF THE INVENTION

The present invention relates generally to data storage and, more particularly, to the on-demand allocation of data storage spaces and partitions.

BACKGROUND

Data stored on a computer system is typically arranged into one or more data storage spaces. Collectively, these data storage spaces are often referred to as a database. Each data storage space comprises one or more data items. Data items in a particular space share common characteristics. A data item may have a value for each of these characteristics. For example, relational databases store data in a number of spaces known as tables. The data items in each table, forming the "rows" of the table, share the same "columns" of data, in that for each column of data, any item in the table may have a value.

It is helpful to partition data storage spaces for administrative purposes such as archiving, caching, enhancing performance, copying or deleting data, and free space management. For example, spaces that store data items with date characteristics are often partitioned so that each partition comprises only those items that pertain to a particular range of dates. One partition, for example, might only store data items pertaining to a particular month. Another partition might only store data items that pertain to a particular fiscal quarter. Since a partition also comprises data items that share common characteristics, a partition may also be considered a data storage space.

The determination of to which, if any, partition a data item pertains is made by looking up one or more of the data item's values in a partition mapping. The partition mapping maps certain sets or ranges of values to certain partitions. These sets or ranges of values correspond to one or more characteristics shared by the data items in the partitioned storage space. These characteristics are known as partitioning characteristics. For tables, these sets or ranges of values may correspond to the value of a particular column upon which the partition mapping is said to be based. This column is known as the partitioning column. For example, a partition mapping for a table might be based upon the value of a data item's date column. The mapping could define ranges of dates, such as months or years. Each range could pertain to a separate partition. To determine the partition to which a new data item pertains, one would determine under which of the defined ranges the value of the item's date column fell. Partition mappings may be based on multiple partitioning columns, which is often the case with subpartitions. Partition mappings may also be based on a variety of other characteristics, such as whether a data item pertains to a particular range of numbers or set of discrete values.

When a new data storage space (or partition) is created, a database system typically performs a number of tasks. One of these tasks is to allocate a segment for the space. A segment is the region within a system's memory or filesystem wherein data for a storage space is stored. The segment may be located via a corresponding segment address. The size of the segment may be defined during the creation process, or may be determined by the database system based on factors such as characteristics of the data storage space and database configuration parameters.

Another task typically performed when a space is created is to create metadata describing the new space, which is subsequently maintained by the database system. Database systems typically maintain metadata describing each data storage space and partition. Such metadata may describe, for instance, a data space's name, segment address, and segment size. The metadata may also indicate information that helps interpret the data stored within the segment, such as information about the characteristics of the data items within the data storage space. For example, it may define the size, name, and type of each column of data found within a table. It may also describe a partition's name and mapping scheme. It may also describe performance or functionality enhancing ancillary objects such as indexes. Many database systems maintain this metadata in one or more system storage spaces.

Applications that make use of databases often create a large number of permanent data storage spaces when they are installed or initiated. Often, this is done according to a schema describing each space and partition that the application may use during the course of its operation. By creating spaces up front, applications avoid making costly determinations at later stages concerning the existence of a particular space. However, some or even most of these spaces may not be used for a very long time, if at all. Since segments and metadata must be created for each of them, memory or filesystem resources that could have been used for other purposes are potentially permanently tied up with empty segments and unused metadata. Furthermore, to the extent that certain spaces remain permanently unused, the time spent creating metadata and allocating segments for them also represents undesirable waste.

Currently, the only way to circumvent this problem is for application developers or database administrators to create storage spaces only when they are necessary. Unfortunately, this workaround requires high overhead. Application developers may end up writing potentially large amounts of code to make sure that the required spaces are created at the proper place and time. Database administrators may end up having to become unnecessarily familiar with the structure of their databases, and may furthermore have to devote large amounts of time to anticipating or tracking the needs of applications that use their databases.

It is therefore highly desirable to provide a less overhead-intensive mechanism to overcome the problem of resource-wasting inherent to up-front data storage space creation strategies.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

SUMMARY

Techniques are provided for the on-demand allocation of segments and creation of metadata for previously-created data storage spaces and partitions. By executing the tasks of allocating segments and creating certain (but not necessarily all) metadata the first time that a data storage space is used as opposed to at the time of the space's creation, the techniques disclosed guarantee that unused spaces do not waste system resources with empty segments and unnecessary metadata, thus overcoming a major disadvantage of up-front storage space creation strategies.

According to one embodiment, data is received describing a space to be created in a database system. Based on the data, metadata describing the space is created and maintained in the database system. Data indicating that the space has been created is returned without allocating a segment for the space.

According to one embodiment, data is received indicating a new item to be stored in the database system. It is determined that the new item should be stored in a space for which no segment has previously been allocated. In response to this determination, a segment is allocated for the space. The new item can then be stored in the space. Metadata describing the space is also created in response to the determination.

According to one embodiment, a space is created in a database system. As part of this creation process, first metadata describing the space is created and maintained in the database system. Data is received indicating a new item. Based on the first metadata, it is determined that the new item pertains to the space. In response to the determination, a segment is allocated for the space. Second metadata describing the space is also created in response to the determination. The new item can then be stored in the space. The first metadata indicates information necessary to allocate a segment for the space, determine that an item pertains to the space, and generate the second metadata. The second metadata indicates any information essential to the normal operation of the data storage space not contained in the first metadata.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Exemplary Database System

Figure 1A:
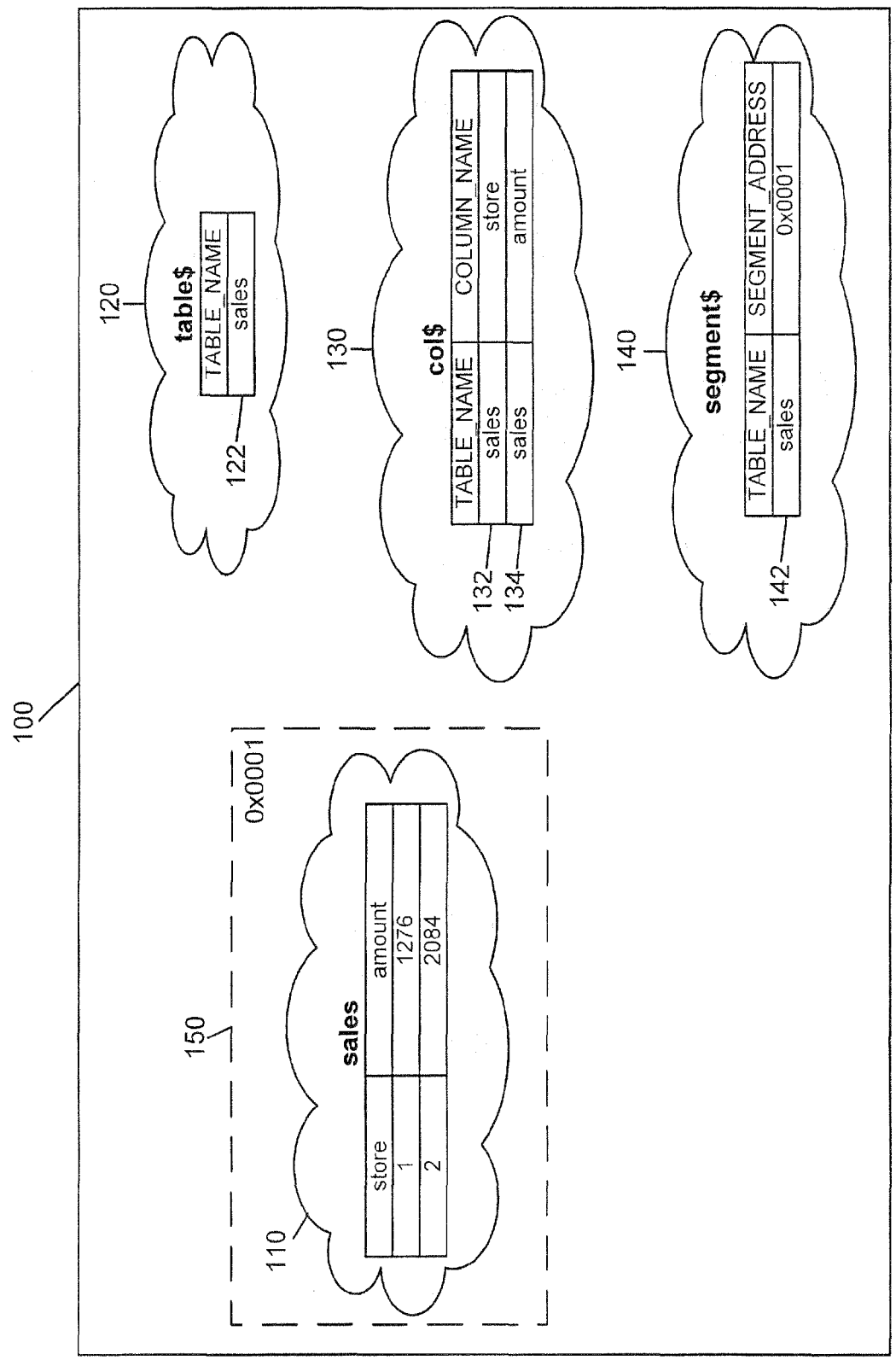
FIG. 1A depicts an exemplary database system in which an embodiment of the invention may be practiced.

FIG. 1A depicts an exemplary database system in which an embodiment of the invention may be practiced. Database system 100 is a relational database comprising a number of data storage spaces. As used herein, the term "space" refers to database objects such as tables and partitions. Among these spaces are table 110, storing example data, and system tables 120, 130, and 140, storing metadata describing spaces in database system 100. Database system 100 may reside on any computing system, including a single computer or system of clustered servers.

System table 120, labeled table$, comprises data indicating the name of each table in the database. For example, row 122 indicates that there is a table named sales in the database. Indeed, the name of table 110 is sales.

System table 130, labeled col$, comprises data indicating the columns that may be found in each table within the database. For example, row 132 indicates that there is a column named stores within the sales table. Row 134 indicates that there is a column named amount within the sales table. Indeed, table 110 contains both of these columns.

System table 140, labeled segment$, comprises data indicating the location of the segment wherein the data for a particular space may be found. For example, row 142 indicates that the segment for the table named sales is found at the address 0x0001. Indeed, table 110 is located within segment 150, which is depicted to start at address 0x0001.

Segment 150 stores the data constituting table 110. Segment 150 may reside on any medium capable of storing data, including in system memory or on a physical disc within the system. It should be noted that table 110 is merely an interpretation of the data stored within segment 150, based on the previously described metadata from system tables 120 and 130. Table 110 is not necessarily representative of how the data in segment 150 is actually stored. Indeed, the data in segment 150 may be stored using any means known within the art, as long as it may be interpreted by database system 100 to represent table 110. The same holds true of any table or segment within database system 100.

Figure 1B:
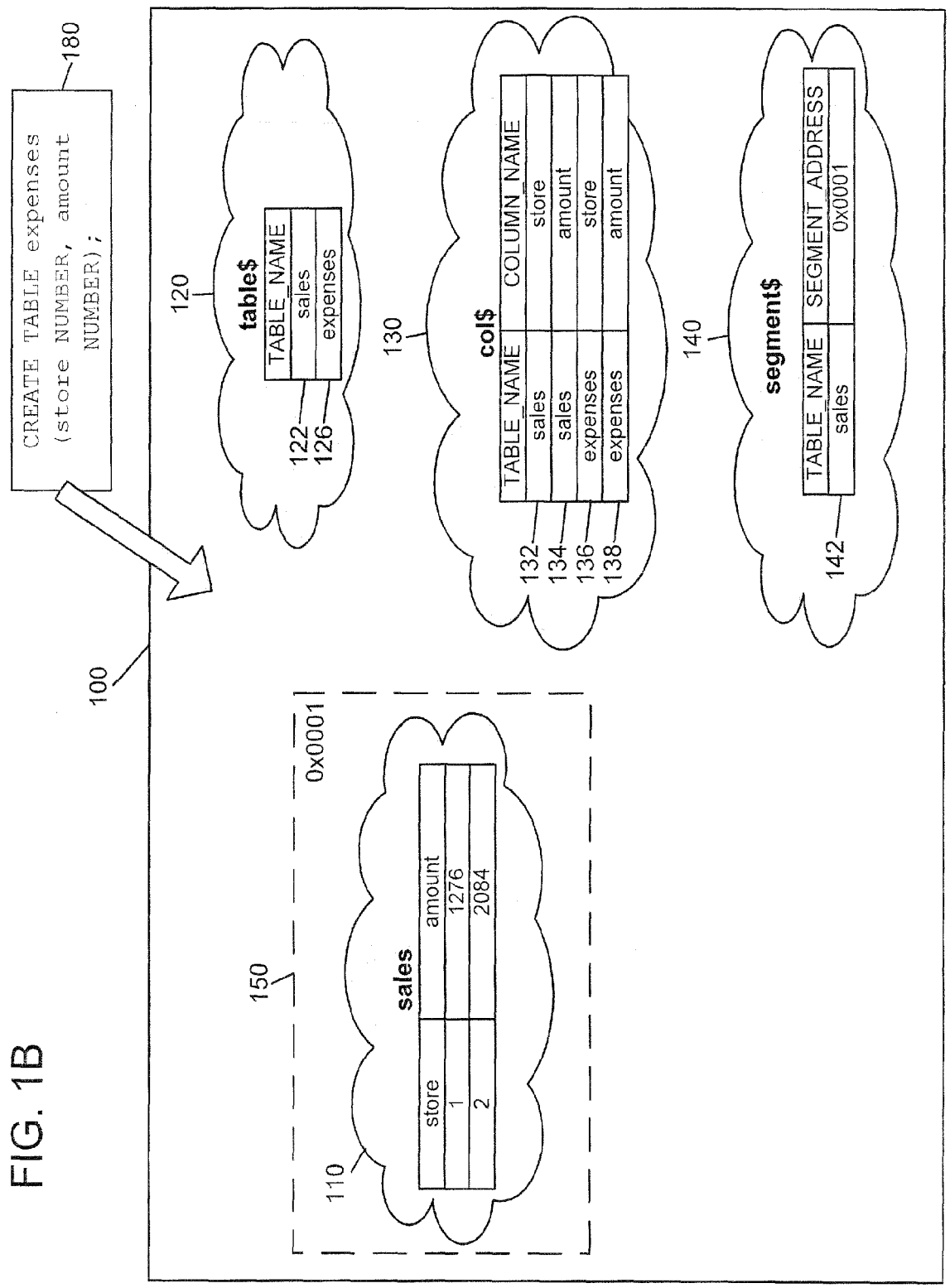
FIG. 1B depicts an exemplary database system in which a new data storage space has been created according to an embodiment of the invention.

FIG. 1B depicts an exemplary database system in which a new data storage space has been created according to an embodiment of the invention. In particular, FIG. 1B depicts the changes made to database system 100 of FIG. 1A in response to SQL statement 180, which indicates a data storage space to add to database system 100. SQL statement 180 is the following statement:

CREATE TABLE expenses (store NUMBER, amount NUMBER);

Data indicating this SQL statement has been received by database system 100. In response to receiving this statement, database system 100 has created a table named expenses with number-based columns store and amount. However, because no data items pertaining to the table named expenses have been received by database system 100, database system 100 has not allocated a segment for the table named expenses. Database system 100 has, however, created metadata describing the table named expenses. This metadata has been stored within the database as rows 126, 136, and 138. Row 126 indicates that there is a table named expenses within database system 100. Row 136 indicates that there is column named store within the expenses table. Row 138 indicates that there is a column named amount within the expenses table.

Because metadata describing the expenses table exists within database system 100, certain operations may now be performed with respect to the expenses table even though no segment has been allocated for the expenses table. For example, a request to drop the expenses table, alter that table's characteristics, or query that table's column names may be honored based on the metadata already stored for the expenses table. Indeed, assuming the relevant metadata has been stored, database system 100 may continue to function normally with regards to operations concerning any table without an allocated segment, as long as the operation does not result in data being stored in the table.

This technique may be modified to accommodate metadata other than that depicted in FIG. 1B. For example, if the CREATE TABLE statement were to describe certain qualities of the columns contained within the table, such as that a column is an indexed column or contains unique values, metadata could be stored within the database to indicate these qualities. One of the depicted system tables could be modified to store this metadata, or other system tables could be used.

Indeed, in response to a request to create a new data storage space, the database system may create metadata indicating all information necessary to allocate fully a segment for the space in the future, as well as all information necessary to generate any other metadata that may be required for normal operations upon segment allocation. This metadata may fully describe, for example, each column within the storage space. This metadata may also indicate information necessary to determine which data items should be stored in the space, such as a user-defined name for the table, or, in the case of partitions, a partition mapping scheme.

Figure 1C:
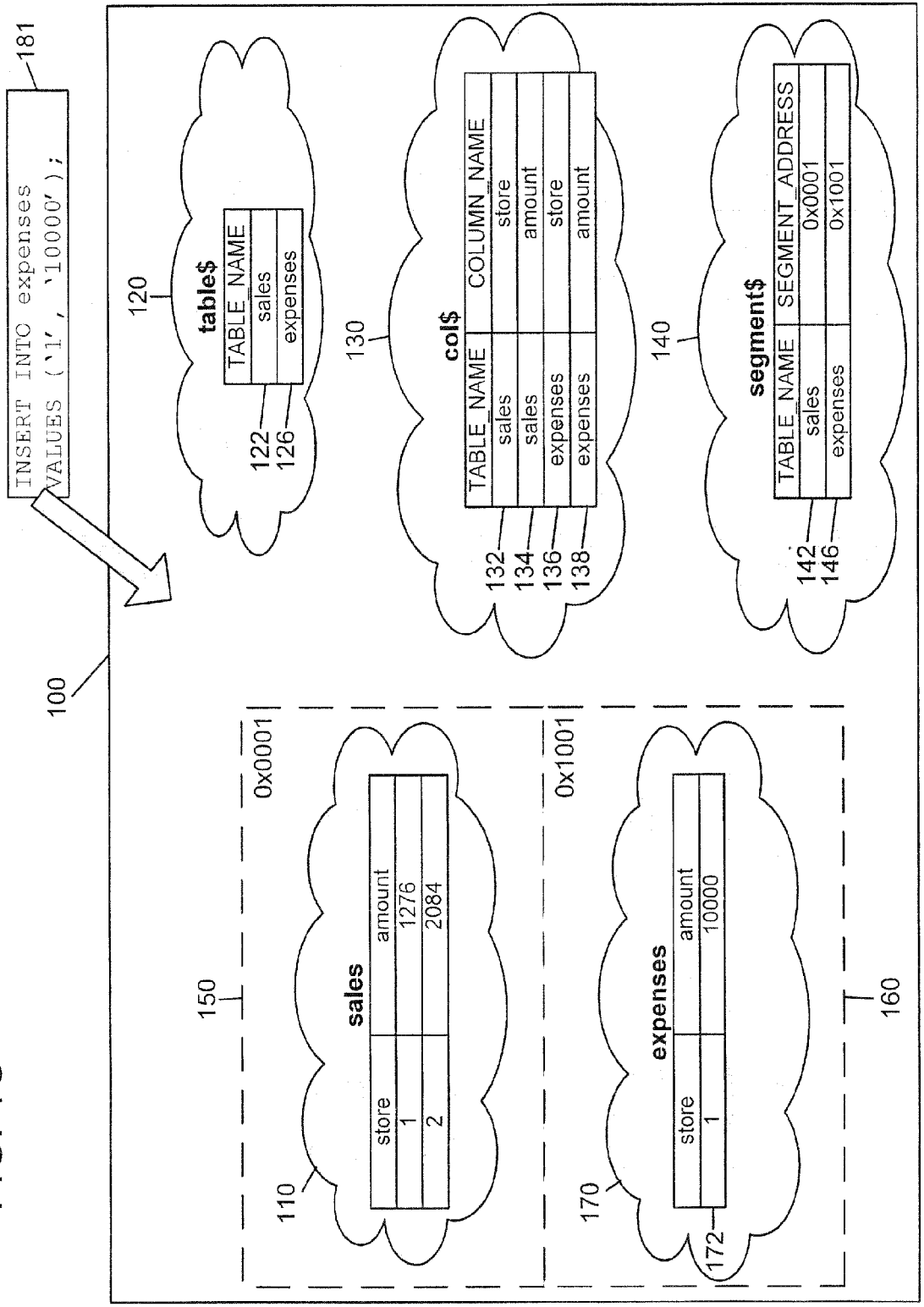
FIG. 1C depicts an exemplary database system in which a new data item has been added according to an embodiment of the invention.

FIG. 1C depicts an exemplary database system in which a new data item has been added according to an embodiment of the invention. Database system 100 is the same as depicted in FIG. 1B, except that a new segment has been allocated and new metadata has been created. These changes were made after receiving data indicating the SQL statement 181, which reads as follows:

INSERT INTO expenses VALUES ('1', '10000');

This SQL statement instructed database system 100 to add a new data item to the table named expenses. Based on system table 120, database system 100 determined that database system 100 does indeed contain a table named expenses to which the new data item may be added. However, when database system 100 tried to locate the segment for the expenses table, database system 100 discovered that there was no row in system table 140 of FIG. 1B for the expenses table. Accordingly, database system 100 determined that no segment had previously been allocated for the expenses table.

The changes to database system 100 depicted in FIG. 1C were made in response to this determination. Segment 160 was allocated for the expenses table. New metadata was also created in response to the afore-mentioned determination. This metadata has been stored in row 146 of system table 140. The metadata indicates the segment address at which the newly allocated segment 160 for table 170 may be found.

Using this new metadata in tandem with the already existing metadata within system tables 120 and 130, the data in segment 160 is properly interpreted as table 170. In accordance with the metadata stored within table 130, table 170 comprises two columns, store and amount. Having fully allocated a segment for the expenses table, and having created metadata describing the segment, the new data item was stored in table 170 as row 172.

Metadata other than that depicted in FIG. 1C may be created in response to determining that a new item should be stored in a data storage space for which no segment has previously been allocated. For example, ancillary objects such as indexes may be created at this time. If the data storage space is a partition, a partition name may be created at this time as well. Metadata indicating such information could be stored in a modified version of one of the depicted tables or in other system tables.

Furthermore, the techniques described above may be implemented for spaces other than tables and in non-relational databases. Likewise, the metadata may be maintained in forms other than as system tables.

The techniques described above may also be implemented for partitions. For example, the segment$ table could indicate the segment at which each partition may be found. A partition$ table could describe the partitions and their mappings. A determination of whether a new item pertains to a partition for which no segment previously has been allocated could be made by determining which partition the item is mapped to in the relevant partition mapping, and then determining whether there is an entry for that partition in the segment$ table.

Process Flow for Creating a Space

Figure 2:
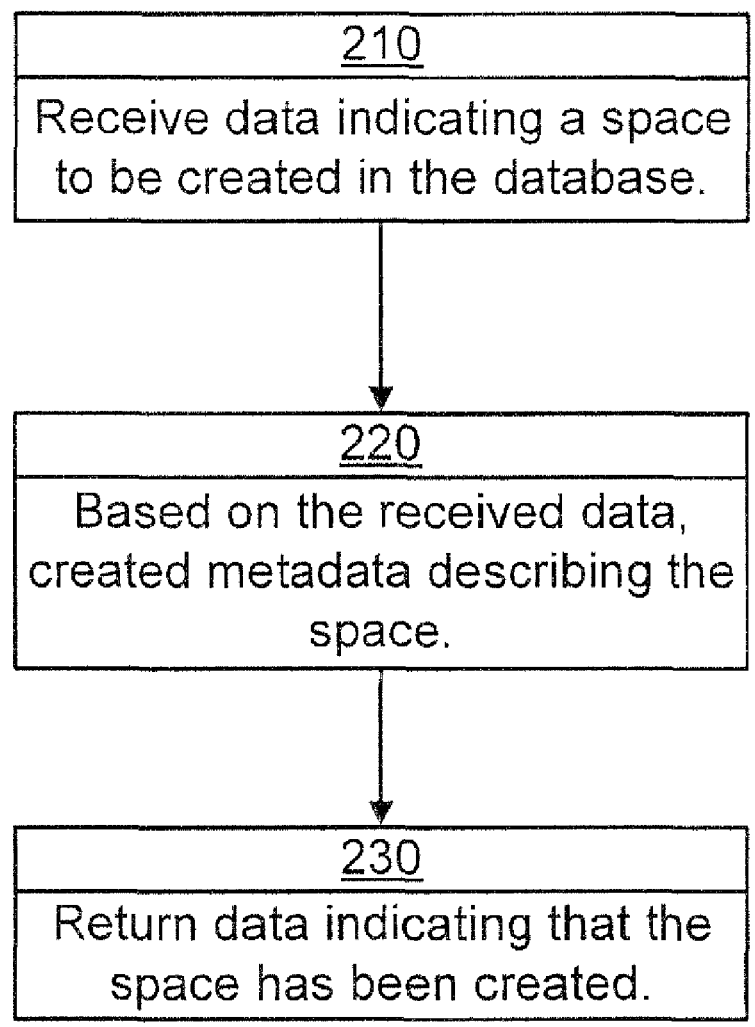
FIG. 2 is a flowchart illustrating the operation of an embodiment of the invention in which a data storage space is created without allocating a segment for the space.

FIG. 2 is a flowchart illustrating the operation of an embodiment of the invention in which a data storage space is created without allocating a segment for the space. In step 210, data is received indicating a space to be created in the database. The data may be, for example, an SQL statement such as CREATE TABLE or a database schema. The data may also describe characteristics of the space. The space may be any data storage space, including a table or partition of a table.

In step 220, based on this data, metadata is created describing the space. This metadata may be maintained within system tables in the database, or in other data storage locations. The metadata may comprise data indicating information sufficient to allocate a segment for the space in the future and allow for normal operations with relation to the space once the segment has been allocated. For example, the metadata may describe the name of the space, characteristics of the space such as column names and types, and the size of the segment that should be allocated to the space. Because this information may have been indicated in the data received in step 210, the metadata created may be based in whole or in part on the data received in step 210. The metadata may also indicate that no segment has been allocated for the table, either implicitly, in that no segment address has been assigned to the space, or explicitly.

The metadata created in this step need not be all metadata that the database system would need to create in order to allow for normal operation upon segment allocation. Rather the metadata may merely be sufficient enough that all metadata necessary for normal operation upon segment allocation could be created based on the metadata created in this step. For example, many database systems require metadata indicating a segment address for a space. This metadata does not need to be created in step 220. Rather, the database system could use metadata from step 220, such as the desired segment size, to create the segment address metadata when the segment is allocated.

In step 230, upon creating the metadata, data is returned indicating that the space has been created. No segment is allocated for the space at this time. However, depending on the metadata created in step 220, many operations may subsequently be performed in relation with the space without allocating a segment. Such operations may include deleting the space, altering the space, or querying for information about the space's characteristics.

According to one embodiment, a segment is only necessary when the space is used to store data. Thus, no system resources are wasted by potentially empty spaces as a result of space creation according to this embodiment of the invention. Furthermore, because the creation of certain metadata may be postponed until segment creation, space is also conserved in relation to this metadata. Finally, since both segment allocation and metadata creation can be time-intensive operations, the speed of the space creation process is increased according to this embodiment.

Process Flow for On-Demand Segment Allocation

Figure 3:
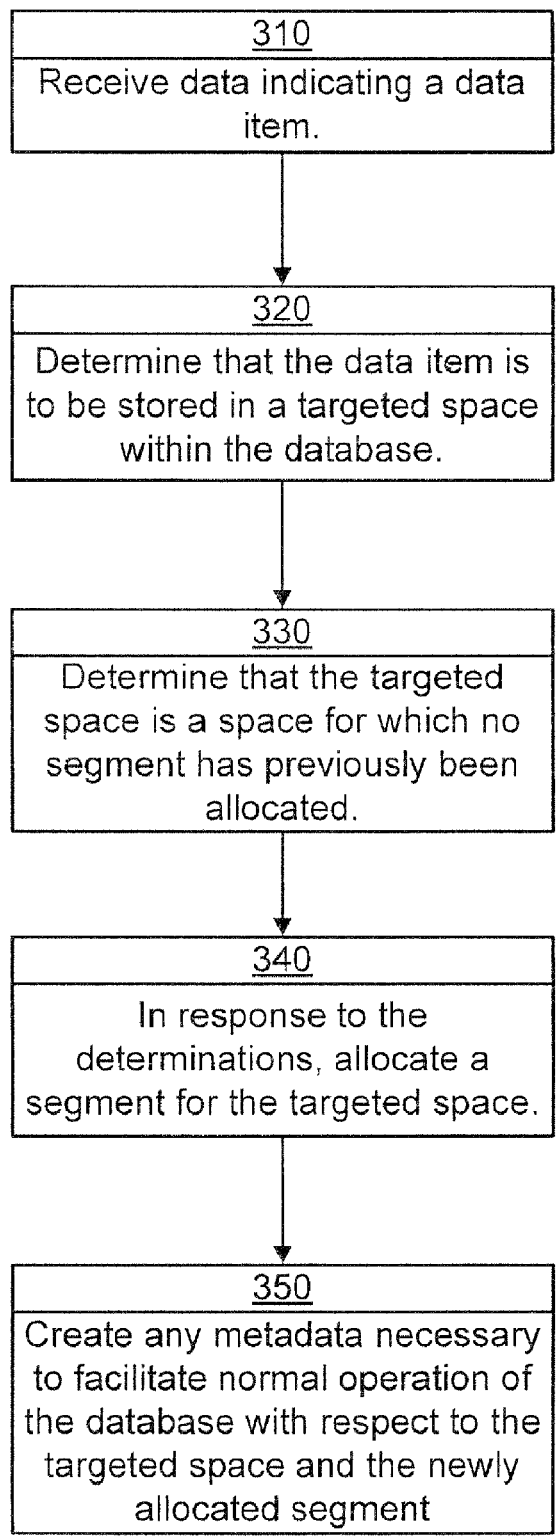
FIG. 3 is a flowchart illustrating the operation of an embodiment of the invention in which a segment is allocated for a previously created data storage space on demand instead of when the space was created.

FIG. 3 is a flowchart illustrating the operation of an embodiment of the invention in which a segment is allocated for a previously created data storage space on demand instead of when the space was created.

In step 310, data is received indicating a data item. The data may be, for example, an SQL statement such as INSERT.

In step 320, it is determined that the data item is to be stored in a particular space (i.e. the targeted space). The determination may be made using any means known within the art, and may be at least partly based on the data received in step 310. For example, the data may mention the targeted space by name. In the case of a partition, a partition mapping may also be examined to determine that the data item pertains to the targeted space.

In step 330, it is determined that the targeted space is a space for which no segment has been allocated. The space may have been previously created using a technique such as that depicted in FIG. 2 that does not involve allocating a segment for the space. The determination may be made using any means known within the art, and may be based at least partly on previously created metadata, such as that created in step 220 of FIG. 2. For example, there may be metadata available to the database system indicating that no segment has been allocated for the space. Also, the determination may be based on the lack of metadata indicating a segment address for the space.

In step 340, in response to the determinations of step 320 and 330, a segment is allocated for the targeted space. Methods for allocating segments for data storage spaces are well-known within the art. The segment may be allocated in accordance with previously created metadata, such as that created in step 220 of FIG. 2. Such metadata may, for example, indicate a size for the segment.

In step 350, any previously uncreated metadata necessary to facilitate normal operation of the database system with respect to the targeted space and the newly allocated segment are created. Such metadata may include, for example, data indicating information about the segment, such as the segment address and size, or about the space, such as a partition name. Such metadata may also include performance or functionality enhancing ancillary objects such as indexes. Depending on what metadata has already been created for the space, it may not be necessary to create any metadata in this step.

Hardware Overview

Figure 4:
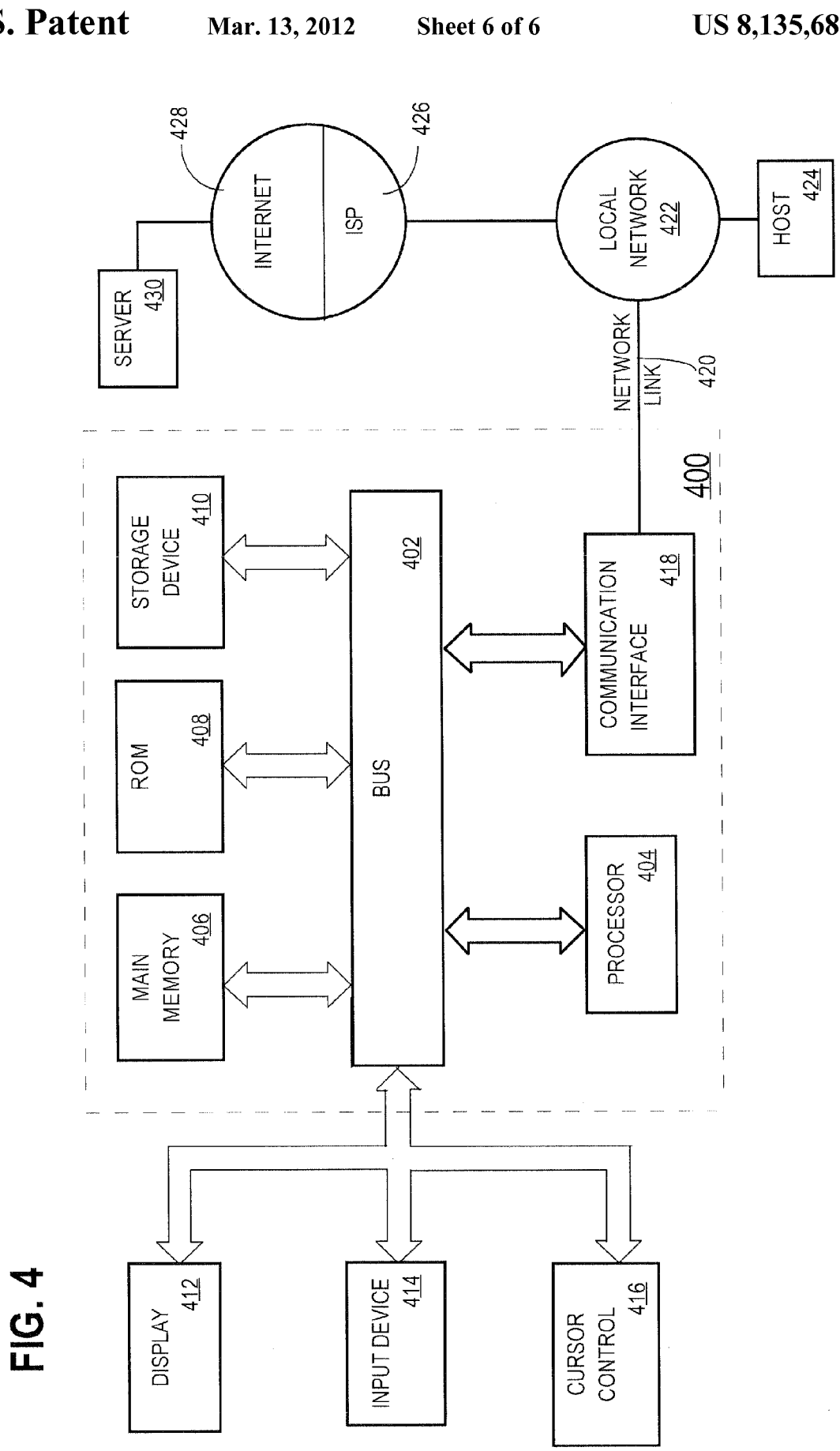
FIG. 4 is a block diagram that illustrates a computer system upon which an embodiment of the invention may be implemented.

FIG. 4 is a block diagram that illustrates a computer system 400 upon which an embodiment of the invention may be implemented. Computer system 400 includes a bus 402 or other communication mechanism for communicating information, and a processor 404 coupled with bus 402 for processing information. Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

The invention is related to the use of computer system 400 for implementing the techniques described herein. According to one embodiment of the invention, those techniques are performed by computer system 400 in response to processor 404 executing one or more sequences of one or more instructions contained in main memory 406. Such instructions may be read into main memory 406 from another machine-readable medium, such as storage device 410. Execution of the sequences of instructions contained in main memory 406 causes processor 404 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 400, various machine-readable media are involved, for example, in providing instructions to processor 404 for execution. Such a medium may take many forms, including but not limited to, non-volatile media, volatile media, and transmission media. Non-volatile media includes, for example, optical or magnetic disks, such as storage device 410. Volatile media includes dynamic memory, such as main memory 406. Transmission media includes coaxial cables, copper wire and fiber optics, including the wires that comprise bus 402. Transmission media can also take the form of acoustic or light waves, such as those generated during radio-wave and infra-red data communications. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 404 for execution. For example, the instructions may initially be carried on a magnetic disk of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are exemplary forms of carrier waves transporting the information.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution. In this manner, computer system 400 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method for managing data storage spaces in a database stored upon one or more computer-readable media, comprising:

in response to one or more requests that collectively define at least a first partition and a second partition to create within a table in the database, the table comprising a plurality of partitions including the first partition and the second partition, storing metadata defining a partition mapping, without allocating a region in the one or more computer-readable media for storing data items belonging to at least the second partition of the plurality of partitions;

wherein the partition mapping indicates, based upon one or more characteristics of data items that are to be stored in the table, in which of the plurality of partitions a given data item of the data items is to be stored;

while maintaining the metadata defining the partition mapping, without having yet allocated a region in the one or more computer-readable media for storing any data items belonging to the second partition:

processing a first instruction to insert a first item into the table;

in response to the first instruction, based at least on the partition mapping and one or more values in the first item for the one or more characteristics, selecting the first partition as a partition in which the first item is to be stored;

identifying a first region in the one or more computer-readable media that has already been allocated for storing data items belonging to the first partition;

responsive to the first instruction, storing the first item in the first region of the one or more computer-readable media;

processing a second instruction to insert a second item into the table, wherein the first instruction is different than the second instruction;

in response to the second instruction, based at least on the partition mapping and one or more values in the second item for the one or more characteristics, selecting the second partition as a partition in which the second item is to be stored; and in response to selecting the second partition, determining that no region has been allocated in the one or more computer-readable media for storing data items belonging to the second partition;

in response to the determining that no region has been allocated in the one or more computer-readable media for storing data items belonging to the second partition, allocating a second region in the one or more computer readable media for storing data items belonging to the second partition;

responsive to the second instruction, storing the second item in the second region;

wherein the method is performed by one or more computing devices.

2. The method of claim 1 wherein the metadata comprises data indicating, for each partition of the plurality of partitions in the table, whether a region has been allocated for the partition;

wherein the step of determining that no region has been allocated for the second partition is based at least in part upon the metadata; and wherein the step of allocating the second region for the second partition is made in accordance with the metadata.

3. The method of claim 1 wherein the metadata includes at least a name for the table and data describing columns of data within the table.

4. The method of claim 1, further comprising:

updating the metadata to include an address at which the second region is located.

5. The method of claim 1 wherein the second partition is a partition within a partition.

6. The method of claim 1, further comprising, in response to determining that no region has been allocated for the second partition, updating the metadata to include a name of the second partition.

7. The method of claim 1, wherein the partition mapping is a function of the one or more characteristics, wherein the one or more characteristics are one or more columns of data to be stored in the first space.

8. The method of claim 1, wherein the at least one or more characteristics defined by the metadata include data indicating, for the second partition, a range or set of values for a partitioning column of the plurality of data items, wherein determining to store the second item in the second partition comprises at least determining that a value in the second item's partitioning column is in the range or set of values.

9. The method of claim 1, wherein the second region is a segment.

10. The method of claim 1, wherein allocating the second region comprises determining a size for the second partition based on the metadata, locating an unallocated portion of memory of the determined size, and storing the address of the portion of memory in the metadata in association with the second partition.

11. The method of claim 1, wherein the one or more requests comprise one or more of: a command to create a partition, a command to create a table, or a database schema.

12. The method of claim 1, wherein the first region is of a first size sufficient to store a first plurality of items that will be mapped to the first partition, wherein the second region is of a second size sufficient to store a second plurality of items that will be mapped to the second partition.

13. The method of claim 1, further comprising, prior to processing of the first instruction, allocating the first region in response to processing a third instruction to insert a third item into the table, the third item being mapped by the partition mapping to the first partition.

14. The method of claim 1, wherein the first item and the second item are both rows within the table.

15. The method of claim 1, wherein the metadata stored in response to the one or more requests indicates a partition size, wherein allocating the second region comprises allocating a region of the partition size indicated by the metadata.

16. The method of claim 1, wherein each of the plurality of partitions corresponds to a different range of date values in a date-based partitioning column of the table.

17. One or more non-transitory media storing one or more sequences of instructions which, when executed by one or more processors, causes performance of a method for managing data storage spaces in a database stored upon one or more computer-readable media, the method comprising:

in response to one or more requests that collectively define at least a first partition and a second partition to create within a table in the database, the table comprising a plurality of partitions including the first partition and the second partition, storing metadata defining a partition mapping, without allocating a region in the one or more computer-readable media for storing data items belonging to at least the second partition of the plurality of partitions;

wherein the partition mapping indicates, based upon one or more characteristics of data items that are to be stored in the table, in which of the plurality of partitions a given data item of the data items is to be stored;

while maintaining the metadata defining the partition mapping, without having yet allocated a region in the one or more computer-readable media for storing any data items belonging to the second partition:

processing a first instruction to insert a first item into the table;

in response to the first instruction, based at least on the partition mapping and one or more values in the first item for the one or more characteristics, selecting the first partition as a partition in which the first item is to be stored;

identifying a first region in the one or more computer-readable media that has already been allocated for storing data items belonging to the first partition;

responsive to the first instruction, storing the first item in the first region of the one or more computer-readable media;

processing a second instruction to insert a second item into the table, wherein the first instruction is different than the second instruction;

in response to the second instruction, based at least on the partition mapping and one or more values in the second item for the one or more characteristics, selecting the second partition as a partition in which the second item is to be stored; and in response to selecting the second partition, determining that no region has been allocated in the one or more computer-readable media for storing data items belonging to the second partition;

in response to the determining that no region has been allocated in the one or more computer-readable media for storing data items belonging to the second partition, allocating a second region in the one or more computer readable media for storing data items belonging to the second partition;

responsive to the second instruction, storing the second item in the second region.

18. The one or more non-transitory media of claim 17,
wherein the metadata comprises data indicating, for each partition of the plurality of partitions in the table, whether a region has been allocated for the partition;
wherein the step of determining that no region has been allocated for the second partition is based at least in part upon the metadata; and
wherein the step of allocating the second region for the second partition is made in accordance with the metadata.

19. The one or more non-transitory media of claim 17, wherein the metadata includes at least a name for the table and data describing columns of data within the table.

20. The one or more non-transitory media of claim 17, wherein the one or more sequences of instructions, when executed by the one or more processors, further cause performance of:
updating the metadata to include an address at which the second region is located.

21. The one or more non-transitory media of claim 17 wherein the second partition is a partition within a partition.

22. The one or more non-transitory media of claim 21, wherein the one or more sequences of instructions, when executed by the one or more processors, further cause performance of:
in response to determining that no region has been allocated for the second partition, updating the metadata to include a name of the second partition.

23. The one or more non-transitory media of claim 17, wherein the partition mapping is a function of the one or more characteristics, wherein the one or more characteristics are one or more columns of data to be stored in the first space.

24. The one or more non-transitory media of claim 17, wherein the at least one or more characteristics defined by the metadata include data indicating, for the second partition, a range or set of values for a partitioning column of the plurality of data items, wherein determining to store the second item in the second partition comprises at least determining that a value in the second item's partitioning column is in the range or set of values.

25. The one or more non-transitory media of claim 17, wherein the second region is a segment.

26. The one or more non-transitory media of claim 17, wherein allocating the second region comprises determining a size for the second partition based on the metadata, locating an unallocated portion of memory of the determined size, and storing the address of the portion of memory in the metadata in association with the second partition.

27. The one or more non-transitory media of claim 17, wherein the one or more requests comprises one or more of: a command to create a partition, a command to create a table, or a database schema.

28. The one or more non-transitory media of claim 17, wherein the first region is of a first size sufficient to store a first plurality of items that will be mapped to the first partition, wherein the second region is of a second size sufficient to store a second plurality of items that will be mapped to the second partition.

29. The one or more non-transitory media of claim 17, wherein the one or more sequences of instructions, when executed by the one or more processors, further cause performance of, prior to processing of the first instruction, allocating the first region in response to processing a third instruction to insert a third item into the table, the third item being mapped by the partition mapping to the first partition.

30. The one or more non-transitory media of claim 17, wherein the first item and the second item are both rows within the table.

31. The one or more non-transitory media of claim 17, wherein the metadata stored in response to the one or more requests indicates a partition size, wherein allocating the second region comprises allocating a region of the partition size indicated by the metadata.

32. The one or more non-transitory media of claim 17, wherein each of the plurality of partitions corresponds to a different range of date values in a date-based partitioning column of the table.

* * * * *

UNITED STATES PATENT AND TRADEMARK OFFICE
CERTIFICATE OF CORRECTION

PATENT NO.        : 8,135,688 B2                                  Page 1 of 1
APPLICATION NO.   : 11/764131
DATED             : March 13, 2012
INVENTOR(S)       : Shankar et al.

It is certified that error appears in the above-identified patent and that said Letters Patent is hereby corrected as shown below:

In column 13, line 17, in Claim 27, delete "comprises" and insert -- comprise --, therefor.

Signed and Sealed this
Twenty-ninth Day of May, 2012

David J. Kappos
*Director of the United States Patent and Trademark Office*